United States Patent Office 2,911,259
Patented Nov. 3, 1959

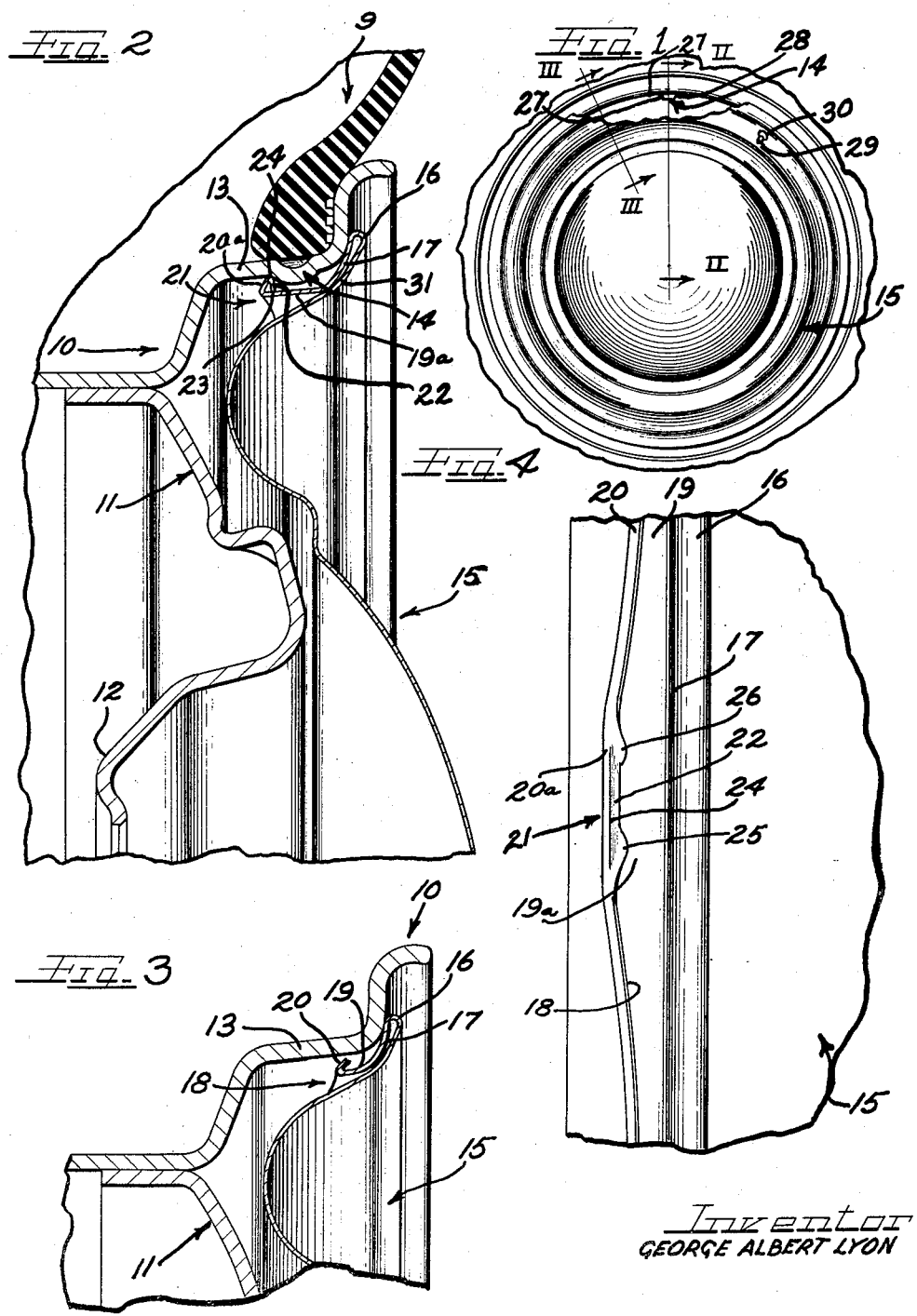

2,911,259
WHEEL COVER

George Albert Lyon, Detroit, Mich.

Application July 22, 1955, Serial No. 523,854

7 Claims. (Cl. 301—37)

This invention relates to wheel structures and more particularly to a cover for disposition on the outer side of a vehicle wheel. In the automobile industry there is a never ending search for wheel and cover constructions which more readily lend themselves to large scale production techniques at lowest possible costs. The present invention is directed towards a wheel structure including a cover having retaining means integrally formed therewith which is capable of developing highly satisfactory gripping characteristics when mounted on a vehicle wheel.

It is therefore an important object of the present invention to provide a wheel cover construction which may be readily and economically manufactured on a large production basis.

Another object of this invention is to provide novel retaining means for mounting the cover onto the wheel.

A further object of this invention is to provide a novel cover construction cooperable with bump-like projections on the wheel capable of insuring relative corotation of the cover with the wheel when mounted on the wheel.

According to the general features of the present invention there is provided in a wheel structure including flanged rim and body parts with one of the axial rim flanges provided with a series of circumferentially spaced bump-like projections, a cover for disposition on the outer side of the wheel having an outer annular margin provided with bump gripping means, the means including an annular resilient axial leg, an annular radial leg terminating in a radially turned under stiffening terminal, the radial leg and stiffening terminal defining together a backed-up stiffened radial extension having an edge capable of being deflected into tensioned cover retaining engagement with the bump-like projection.

Other objects and features of this invention will more fully appear from the following detailed description taken in connection with the accompanying drawing which illustrates a single embodiment thereof and in which:

Figure 1 is a fragmentary side view of a wheel having mounted thereon a cover embodying the features of this invention;

Figure 2 is an enlarged fragmentary cross sectional view taken on substantially line II—II of Fig. 1 looking in the direction indicated by the arrows;

Figure 3 is an enlarged fragmentary cross sectional view taken substantially on the line III—III of Fig. 1, looking in the direction indicated by the arrows; and Figure 4 is an enlarged fragmentary edge elevation of the cover as shown in Figure 2.

As shown on the drawings:

The reference character 9 designates generally a conventional type of tubeless tire mounted in the usual way, upon a so-called multi-flange drop center type of rim 10. This rim is carried in the usual way upon a dished wheel body member or spider 11 having the customary central bolt-on flange 12 adapted to be detachably secured by bolts or cap screws (not shown) to a part on the axle of a vehicle.

The multi-flanged tire rim 10 has a series of step-like flanges, including a generally axially extending flange 13 provided with a series or plurality of circumferentially spaced bump-like projections 14 pressed out of the axial flange 13.

The present invention is particularly concerned with the wheel cover designated generally by the reference numeral 15 and more especially with its manner of retention on the bumps 14 of the wheel. The cover 15 may comprise a dished metallic stamping which may be either in the form of a circular disk or annulus as is well known in the art. As is illustrated in the drawings, it will be noted that a full disk cover construction has been illustrated. It will be appreciated, however, that my invention is not particularly concerned with the central configuration of the cover, but rather with the manner in which the cover is retained on the wheel.

The cover 15 at its outer margin 16 has a curved turned under annular flange 17 which is suitably formed integral with the cover. This generally radially inwardly projecting flange 17 includes a generally axially rearwardly extending annular portion 18 defined by resilient axial leg 19 and radial leg 20 (Figs. 3 and 4). At circumferentially spaced intervals the axial leg 19 is elongated and along with the radial leg 20 further formed to provide cover retaining means 21 cooperable with the bumps 14 and which may be four or more in number.

The retaining means 21 includes the elongated resilient axial leg 19 and elongated and further deformed radial leg 20a. The radial leg 20a has an integrally formed radially turned under stiffening terminal 22 which is bottomed at 23 against the axial leg 19a. The leg 20a and terminal 22 at their junction define an edge 24 capable of gripping bottomed engagement with the bump 14.

The terminal 22 is crimped axially rearwardly in such a manner as to form circumferentially spaced projections or ears 25 and 26 secured to the radial leg 20a and capable of overlapping the circumferentially spaced side walls 27 and 28 (Fig. 1) of the bumps 14. It is in this manner that relative corotation of the cover and wheel is insured in assembly.

In assembly of the cover on the wheel, the valve stem 29 is inserted through an opening 30 on the cover and it is in this manner that the retaining means 21 is axially aligned with the bumps 14. As the gripping edge 24 engages the bumps 14 it is progressively cammed radially inwardly and thereafter snapped behind the bumps with the projections or ears 25 and 26 on opposite sides of each bumps. It will be appreciated that as the cover is engaged with the bumps the annular resilient leg 19 is urged axially outwardly in bottomed backed-up engagement with the cover generally at 31.

Also, the outer cover margin is bottomed against the tire rim. By backing up the leg 19 against the cover in bottoming the cover against the rim, the cover is held securely against inward axial slippage thereby protecting the retaining elements.

The cover, of course, is easily removable by the insertion of the blunt end of a pry-off tool under the outer margin of the cover and by the forcible ejection of the cover out of its retained engagement with the bumps 14.

It will be understood that modifications and variations may be effected without departing from the scope of the novel concepts of the present invention.

I claim as my invention:

1. In a wheel structure including flanged rim and body parts with one of the axial rim flanges provided with a series of circumferentially spaced bump-like projections, a cover for disposition on the outer side of the wheel having an outer annular margin provided with bump gripping means, said means including an annular resilient axial portion, an annular radial portion connected to said axial portion terminating in a radially turned under stiffening terminal, said radial portion and stiffening terminal defining together a backed-up stiffened radial extension having an edge capable of being deflected into tensioned cover retaining engagement with the pump-like projection, and circumferentially spaced extensions secured to said radial portion with said edge generally therebetween overlapping the circumferentially spaced sides of the bump-like projections when mounted on the wheel in order to insure relative corotation of the cover and wheel.

2. In a wheel structure including rim and body parts with one of the parts having a plurality of circumferentially spaced bump-like projections, a wheel cover for overlying disposition on the outer side of the cover including an annular outer marginal portion provided with finger means at spaced intervals and cooperable with said spaced bump-like projections for cover retaining engagement, said finger means including a resilient relatively long axial leg connected to a relatively short stiff radial leg having a gripping edge, said finger means disposed in a common circle and connected together by an annular band carried by the cover, said axial leg backed-up by said band which is engageable against said outer annular marginal portion when the cover is engaged upon the wheel and a third short stiff straight leg between said gripping edge and axial leg and angled with respect to said radial leg.

3. In a wheel structure including rim and body parts with one of the parts having a plurality of circumferentially spaced bumps, a cover for overlying disposition on the outer side of the wheel including an annular outer marginal portion with its outer periphery turned under to provide an underlying annular L-shaped portion, means connected to said L-shaped portion engageable behind said spaced bumps for cover retaining engagement, said means including a resilient relatively long axial leg connected to a relatively short stiff radial leg having a gripping edge, said radial leg being turned under and having a reinforcing portion bottomed against said axial leg, and a second means connected to said annular margin and carried by said reinforcing portion for insuring relative corotation of the cover when mounted on the wheel.

4. In a wheel structure including rim and body parts with one of the parts having a plurality of circumferentially spaced bumps, a cover for overlying disposition on the outer side of the wheel including an annular outer marginal portion provided with means engageable behind said spaced bumps for cover retaining engagement, said means including a plurality of spring retaining elements, each of which has a short stiff radial portion which is turned under at one end providing a reinforcing portion, said reinforcing portion being nested about said bump to insure co-rotation of the cover when in assembly on the wheel.

5. In a wheel structure, a wheel, a cover structure for assembly with the wheel and cover means for sustaining the cover structure on the wheel including a resilient finger associated with the wheel structure and including an elongated first leg which is turned at one end providing a straight short stiff second leg, said second leg having its free end turned under providing a straight short stiff third reinforcing leg backing up said second leg, the junction of said second and third legs providing a sharp pointed biting edge, said third leg being notched and nested about a bump associated with the wheel structure with said biting edge engageable behind said bump.

6. In a wheel structure including flanged rim and body parts with one of the axial rim flanges provided with a series of circumferentially spaced bump-like projections, a cover for disposition on the outer side of the wheel having an outer annular margin provided with bump gripping means, said means including an annular resilient axial portion, an annular radial portion connected to said axial portion terminating in a radially turned under stiffening terminal, said terminal having a terminal edge generally facing the axial portion, said radial portion and stiffening terminal defining together a backed-up stiffened radial extension having an intermediate pointed edge capable of being deflected into tensioned cover retaining engagement with the bump-like projection.

7. In a wheel structure including flanged rim and body parts with one of the axial rim flanges provided with a series of circumferentially spaced bump-like projections, a cover for disposition on the outer side of the wheel having an outer annular margin provided with bump gripping means, said means including an annular resilient axial portion, an annular radial portion connected to said axial portion terminating in a radially turned under stiffening terminal, said terminal having a terminal edge generally facing the axial portion, said radial portion and stiffening terminal defining together a backed-up stiffened radial extension having an intermediate pointed edge capable of being deflected into tensioned cover retaining engagement with the bump-like projection, and second means connected to said annular margin for insuring relative corotation of the cover when mounted on the wheel.

References Cited in the file of this patent

UNITED STATES PATENTS

| | | |
|---|---|---|
| 2,607,633 | Lyon | Aug. 19, 1952 |
| 2,624,636 | Lyon | Jan. 6, 1953 |
| 2,669,487 | Horn | Feb. 16, 1954 |